(12) United States Patent
Chen

(10) Patent No.: US 9,576,117 B2
(45) Date of Patent: Feb. 21, 2017

(54) ELECTRONIC DEVICE AND PROTECTION METHOD

(71) Applicant: Chiun Mai Communication Systems, Inc., New Taipei (TW)

(72) Inventor: Yu-Chun Chen, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 14/686,240

(22) Filed: Apr. 14, 2015

(65) Prior Publication Data

US 2016/0078204 A1 Mar. 17, 2016

(30) Foreign Application Priority Data

Sep. 15, 2014 (CN) .......................... 2014 1 0469465

(51) Int. Cl.

| G06F 7/04 | (2006.01) |
|---|---|
| G06F 12/00 | (2006.01) |
| G06F 12/14 | (2006.01) |
| G06F 13/00 | (2006.01) |
| G06F 17/30 | (2006.01) |
| G11C 7/00 | (2006.01) |
| G06F 21/30 | (2013.01) |

(52) U.S. Cl.
CPC .................................. *G06F 21/305* (2013.01)

(58) Field of Classification Search
CPC .......... G06F 21/32; G06F 21/31; G06F 21/36; G06F 21/45; G06F 21/316
USPC ............................................................ 726/19
See application file for complete search history.

(56) References Cited

U.S. PATENT DOCUMENTS

| 2010/0134299 A1* | 6/2010 | Fitzgerald ............... G06F 21/88 340/573.1 |
|---|---|---|
| 2012/0237908 A1* | 9/2012 | Fitzgerald ............... G06F 21/88 434/236 |
| 2013/0091564 A1* | 4/2013 | Fitzgerald ............... G06F 21/88 726/17 |

* cited by examiner

*Primary Examiner* — Kambiz Zand
*Assistant Examiner* — Stephen Sanders
(74) *Attorney, Agent, or Firm* — Zhigang Ma

(57) ABSTRACT

A protection method for an electronic device includes generating a control command using a processor of the electronic device when it is determined to acquire information of a current user of the electronic device. The electronic device is controlled to acquire the information of the current user and to acquire data of the electronic device according to the control command. The acquired information is stored. The acquired information and the acquired data is transmitted to the server.

18 Claims, 3 Drawing Sheets

ELECTRONIC DEVICE AND PROTECTION METHOD

CROSS-REFERENCE TO RELATED APPLICATIONS

This application claims priority to Chinese Patent Application No. 201410469465.1 filed on Sep. 15, 2014, the contents of which are incorporated by reference herein.

FIELD

The subject matter herein generally relates to electronic device monitoring technology, and particularly to protection of an electronic device.

BACKGROUND

When an electronic device is lost, a user of the electronic device may desire to know who has picked up the electronic device and how to find the electronic device. The user may also desire to know who uses the electronic device without permission.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
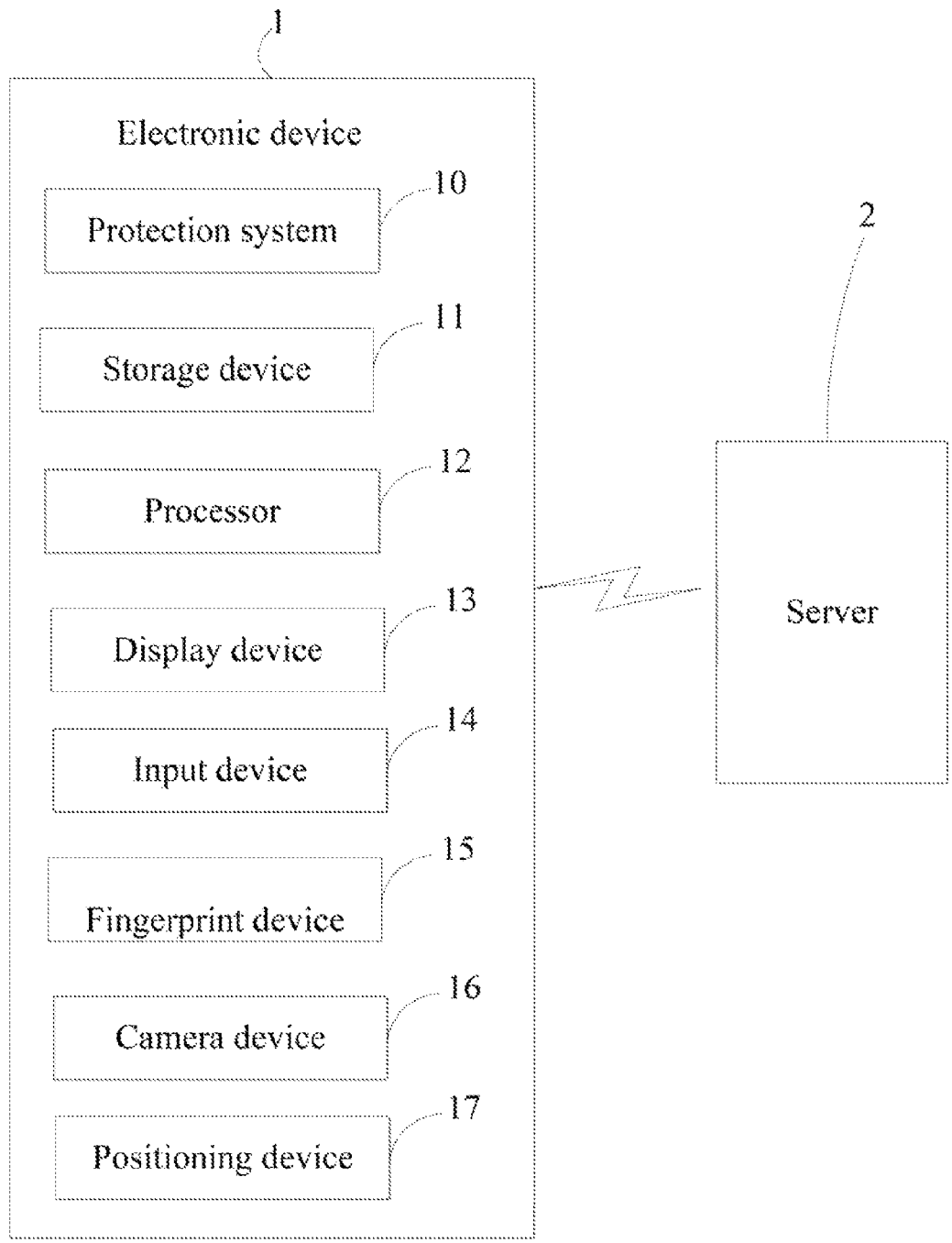
FIG. 1 is a diagrammatic view of one embodiment of an electronic device including a protection system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 illustrates a diagrammatic view of one embodiment of an electronic device. Depending on the embodiment, the electronic device 1 includes, but is not limited to, a protection system 10, a storage device 11, at least one processor 12, a display device 13, and an input device 14. The electronic device 1 can further include a fingerprint device 15, a camera device 16, and a positioning device 17. The electronic device 1 can be a computer, a smart phone, a personal digital assistant (PDA), or another suitable electronic device. FIG. 1 illustrates only one example of the electronic device that can include more or fewer components than illustrated, or have a different configuration of the various components in other embodiments.

The electronic device 1 is connected to a server 2. The server 2 provides a fingerprint database. The fingerprint database pre-stores fingerprint data of residents and identification information of the residents. The identification information includes identification numbers and residence addresses. The server 2 can be computers or another suitable electronic devices.

When the electronic device 1 is lost or the electronic device 1 is used without permission, the protection system 10 can acquire fingerprint data of a current user and transmit the fingerprint data to the server 2. According to the fingerprint data, the server 2 can acquire identification information of the current user. According to the identification information of the current user, an legal user of the electronic device 1 can find the electronic device 1 or know who is using the electronic device 1 without permission.

In at least one embodiment, the storage device 11 can include various types of non-transitory computer-readable storage mediums. For example, the storage device 11 can be an internal storage system, such as a flash memory, a random access memory (RAM) for temporary storage of information, and/or a read-only memory (ROM) for permanent storage of information. The storage device 11 can also be an external storage system, such as a hard disk, a storage card, or a data storage medium. The at least one processor 12 can be a central processing unit (CPU), a microprocessor, or other data processor chip that performs functions of the electronic device 1. The display device 13 can display images and videos, and the input device 14 can be a mouse, a keyboard, or a touch panel.

Figure 2:
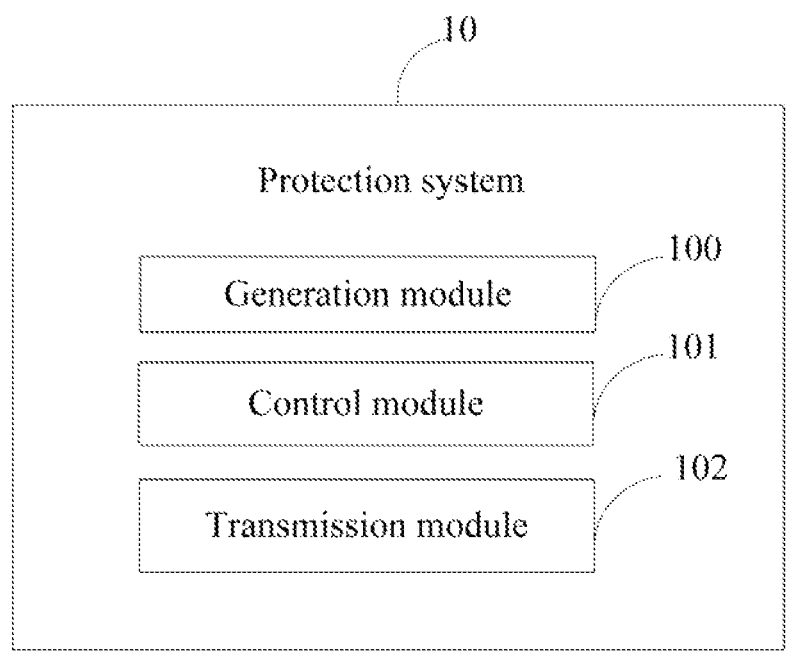
FIG. 2 is a diagrammatic view of one embodiment of function modules of the protection system in the electronic device of FIG. 1.

FIG. 2 is a diagrammatic view of one embodiment of function modules of the management system. In at least one embodiment, the protection system 10 can include a generation module 100, a control module 101, and a transmission module 102. The function modules 100, 101, and 102 can include computerized codes in the form of one or more programs, which are stored in the storage device 11. The at least one processor 12 executes the computerized codes to provide functions of the function modules 100-102.

When it is determined to acquire information of a current user of the electronic device 1, the generation module 100 generates a control command to acquire information of the current user using the processor 12.

In at least one embodiment, when unlocking times of the electronic device 1 within a preset duration is greater than a preset number or in response to receiving a request of acquiring the information of the current user, it is determined to acquire information of the current user. The request can be received from the server 2 or another electronic device which is connected to the electronic device 1. For example, when the electronic device 1 is lost, the user of the electronic device 1 can input a number of the electronic device 1 with an input device of the server 2. The server 2 transmits the request to the electronic device 1 according to the input number. When the electronic device 1 is lost, another electronic device can transmit the request to the electronic device 1 via a short message (SMS).

When unlocking times of the electronic device within the preset duration is not greater than the preset number or no request of acquiring the information of the current user is received, no control command is generated.

The control module 101 controls the electronic device 1 to acquire the information of the current user and to acquire data of the electronic device according to the control command, and stores the acquired information into the storage device 11.

In at least one embodiment, the control module 101 controls the electronic device 1 to acquire fingerprint data of the current user using the fingerprint device 15. The control module 101 controls the electronic device 1 to acquire a video of the current user using the camera device 16. The control module 101 controls the electronic device 1 to acquire position information of the current user using the positioning device 17.

The transmission module 102 transmits the acquired information and the acquired data to the server 2. In at least one embodiment, the acquired information of the current user includes the fingerprint data of the current user, input time of the fingerprint data, the position information of the current user, and the video of the current user. The acquired data of the electronic device 1 includes an International Mobile Equipment Identity (IMIE) of the electronic device 1.

In at least one embodiment, the server 2 pre-stores IMIEs of electronic devices of the residents. When the server 2 receives the acquired information and the acquired data, the server 2 can search for the legal user of the electronic device 1 according to the IMIE of the electronic device 1.

The server 2 compares the fingerprint data of the current user with pre-stored fingerprint data in the fingerprint database, and generates a comparison result. According to the comparison result, the server 2 determines identification information of the current user and transmits the identification information of the current user to predetermined electronic devices according to an identification number of the legal user. Each of the predetermined electronic devices corresponds to the identification number of the legal user. Each of the predetermined electronic devices corresponds to a phone number. Therefore, according to the identification information, the legal user of the electronic device 1 can find the electronic device or know who has used the electronic device 1 without permission.

Figure 3:
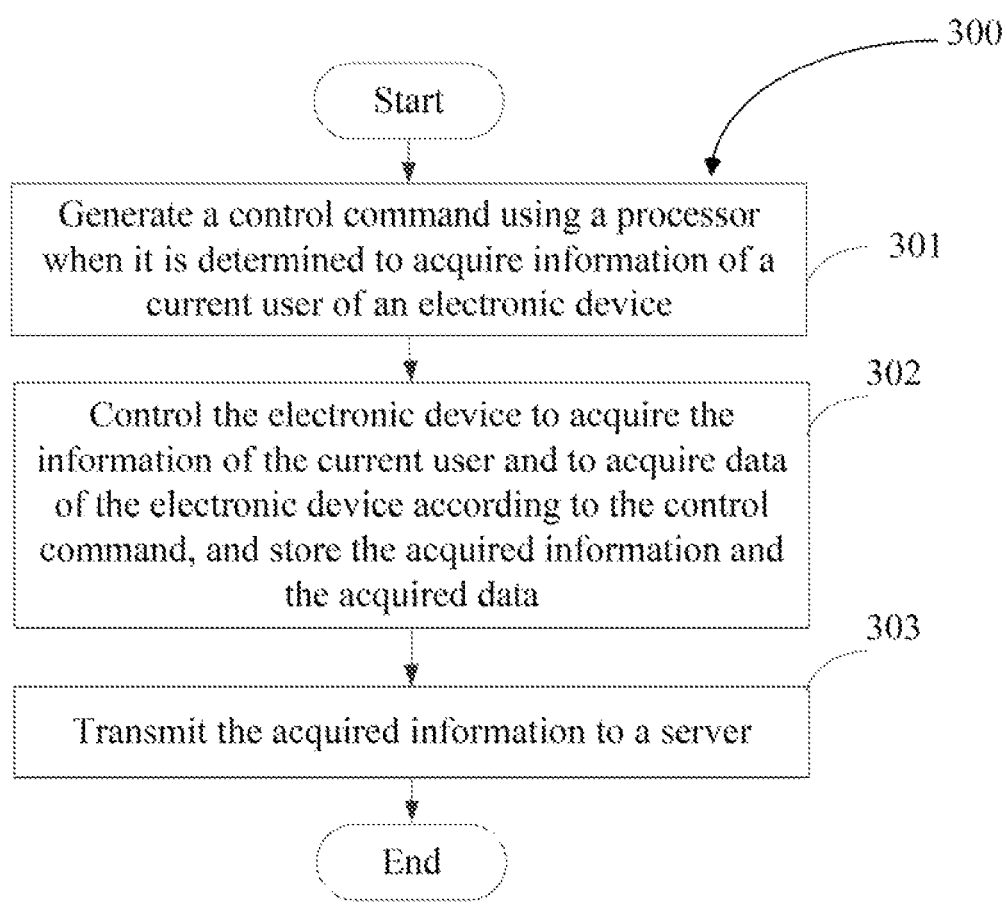
FIG. 3 illustrates a flowchart of one embodiment of a method for protecting the electronic device of FIG. 1.

FIG. 3 illustrates a flowchart is presented in accordance with an example embodiment. The example method 300 is provided by way of example, as there are a variety of ways to carry out the method. The method 300 described below can be carried out using the configurations illustrated in FIGS. 1 and 2 for example, and various elements of these figures are referenced in explaining example method 300. Each block shown in FIG. 3 represents one or more processes, methods, or subroutines carried out in the exemplary method 300. Additionally, the illustrated order of blocks is by example only and the order of the blocks can be changed. The exemplary method 300 can begin at block 301. Depending on the embodiment, additional steps can be added, others removed, and the ordering of the steps can be changed.

At block 301, when it is determined to acquire information of a current user of an electronic device, a generation module generates a control command to acquire information of the current user using a processor of the electronic device.

In at least one embodiment, when unlocking times of the electronic device within a preset duration is greater than a preset number or in response to receiving a request of acquiring the information of the current user, it is determined to acquire information of the current user. The request can be received from a server which is connected to the electronic device or another electronic device which is connected to the electronic device. For example, when the electronic device is lost, the legal user of the electronic device can input a number of the electronic device via an input device of the server. The server transmits the request to the electronic device according to the input number. When the electronic device is lost, another electronic device can transmit the request to the electronic device by a short message (SMS).

When the unlocking times of the electronic device within the preset duration is not greater than the preset number or no request of acquiring the information of the current user is received, no control command is generated.

At block 302, a control module controls the electronic device to acquire the information of the current user and to acquire data of the electronic device according to the control command, and stores the acquired information and the acquired data into a storage device of the electronic device.

In at least one embodiment, the electronic device can further include a fingerprint device, a camera device, and a positioning device. The control module controls the electronic device to acquire fingerprint data of the current user using the fingerprint device. The control module controls the electronic device to acquire a video of the current user using the camera device. The control module controls the electronic device to acquire position information of the current user using the positioning device.

At block 303, a transmission module transmits the acquired information and the acquired data to the server. In at least one embodiment, the acquired information of the current user includes the fingerprint data of the current user, input time of the fingerprint data, the position information of the current user, and the video of the current user. The acquired data of the electronic device includes an International Mobile Equipment Identity (IMIE) of the electronic device.

In at least one embodiment, the server pre-stores IMIE of each electronic device of each of the residents. When the server receives the acquired information and the acquired data, the server can search for the legal user of the electronic device according to the IMIE.

The server compares the fingerprint data of the current user with pre-stored fingerprint data in the fingerprint database, and generates a comparison result. According to the comparison result, the server determines identification information of the current user and transmits the identification information of the current user to predetermined electronic devices according to an identification number of the legal user. Each of the predetermined electronic devices corresponds to the identification number of the legal user. Each of the predetermined electronic devices corresponds to a phone number. Therefore, according to the identification information, the legal user of the electronic device can find the electronic device or know who has used the electronic device without permission.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A computer-implemented method for protecting an electronic device being executed by a processor of the electronic device, the electronic device being connected to a server, the method comprising:
    generating a control command using the processor when it is determined to acquire information of a current user of the electronic device;
    controlling the electronic device to acquire the information of the current user and to acquire data of the electronic device according to the control command, and storing the acquired information and the acquired data; and
    transmitting the acquired information and the acquired data to the server, to enable a legal user of the electronic device to find the electronic device according to identification information of the current user, which is obtained by the server according to the acquired information, wherein the identification information comprises identification numbers and residence addresses.

2. The method according to claim 1, wherein it is determined to acquire the information of the current user of the electronic device when:
    unlocking times of the electronic device within a preset duration is greater than a first preset number; or
    in response to receiving a request of acquiring the information of the current user.

3. The method according to claim 2, wherein the request is received from the server or another electronic device which is connected to the electronic device.

4. The method according to claim 1, wherein the acquired information of the current user comprises fingerprint data of the current user input on the electronic device, input time of the fingerprint data, position information of the current user, and a video of the current user captured by a camera device of the electronic device.

5. The method according to claim 4, wherein the server compares the fingerprint data of the current user with pre-stored fingerprint data in a fingerprint database which stored in a storage device of the server, generates a comparison result, and determines the identification information of the current user according to the comparison result and transmits the identification information of the current user to predetermined electronic devices.

6. The method according to claim 1, wherein the acquired data of the electronic device comprises an International Mobile Equipment Identity (IMIE) of the electronic device.

7. An electronic device, comprising:
    a processor; and
    a storage device that stores one or more programs, the electronic device being connected to a server, when executed by the at least one processor, cause the at least one processor to:
        generate a control command using the processor when it is determined to acquire information of a current user of the electronic device;
        control the electronic device to acquire the information of the current user and to acquire data of the electronic device according to the control command, and storing the acquired information and the acquired data; and
        transmit the acquired information and the acquired data to the server, to enable a legal user of the electronic device to find the electronic device according to identification information of the current user, which is obtained by the server according to the acquired information, wherein the identification information comprises identification numbers and residence addresses.

8. The electronic device according to claim 7, wherein it is determined to acquire the information of the current user of the electronic device when:
    unlocking times of the electronic device within a preset duration is greater than a first preset number; or
    in response to receiving a request of acquiring the information of the current user.

9. The electronic device according to claim 8, wherein the request is received from the server or another electronic device which is connected to the electronic device.

10. The electronic device according to claim 7, wherein the acquired information of the current user comprises fingerprint data of the current user input on the electronic device, input time of the fingerprint data, position information of the current user, and a video of the current user captured by a camera device of the electronic device.

11. The electronic device according to claim 10, wherein the server compares the fingerprint data of the current user with pre-stored fingerprint data in a fingerprint database which stored in a storage device of the server, generates a comparison result, and determines the identification information of the current user according to the comparison result and transmits the identification information of the current user to predetermined electronic devices.

12. The electronic device according to claim 7, wherein the acquired data of the electronic device comprises an International Mobile Equipment Identity (IMIE) of the electronic device.

13. A non-transitory storage medium having stored thereon instructions that, when executed by a processor of an electronic device, the electronic device being connected to a server, causes the processor to perform a protection method, wherein the method comprises:
    generating a control command using the processor when it is determined to acquire information of a current user of the electronic device;
    controlling the electronic device to acquire the information of the current user and to acquire data of the electronic device according to the control command, and storing the acquired information and the acquired data; and
    transmitting the acquired information and the acquired data to the server, to enable a legal user of the electronic device to find the electronic device according to identification information of the current user, which is obtained by the server according to the acquired information, wherein the identification information comprises identification numbers and residence addresses.

14. The non-transitory storage medium according to claim 13, wherein it is determined to acquire the information of the current user of the electronic device when:
    unlocking times of the electronic device within a preset duration is greater than a first preset number; or in response to receiving a request of acquiring the information of the current user.

15. The non-transitory storage medium according to claim 14, wherein the request is received from the server or another electronic device which is connected to the electronic device.

16. The non-transitory storage medium according to claim 13, wherein the acquired information of the current user comprises fingerprint data of the current user input on the electronic device, input time of the fingerprint data, position information of the current user, and a video of the current user captured by a camera device of the electronic device.

17. The non-transitory storage medium according to claim 16, wherein the server compares the fingerprint data of the current user with pre-stored fingerprint data in a fingerprint database which stored in a storage device of the server, generates a comparison result, and determines the identification information of the current user according to the comparison result and transmits the identification information of the current user to predetermined electronic devices.

18. The non-transitory storage medium according to claim 13, wherein the acquired data of the electronic device comprises an International Mobile Equipment Identity (IMIE) of the electronic device.

\* \* \* \* \*